Jan. 8, 1929.
H. J. FRIEDL
CHAIN PLIERS
Filed May 16, 1923
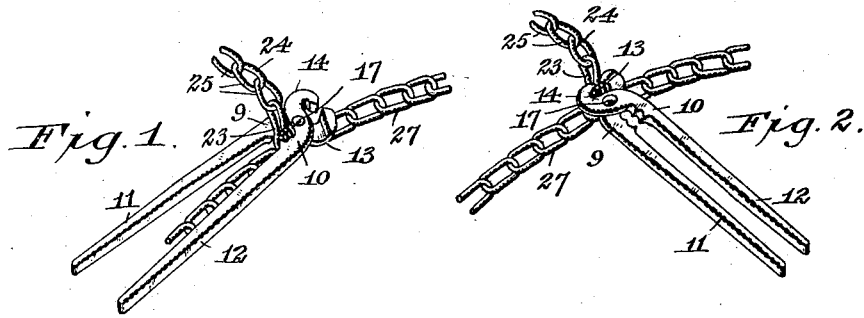
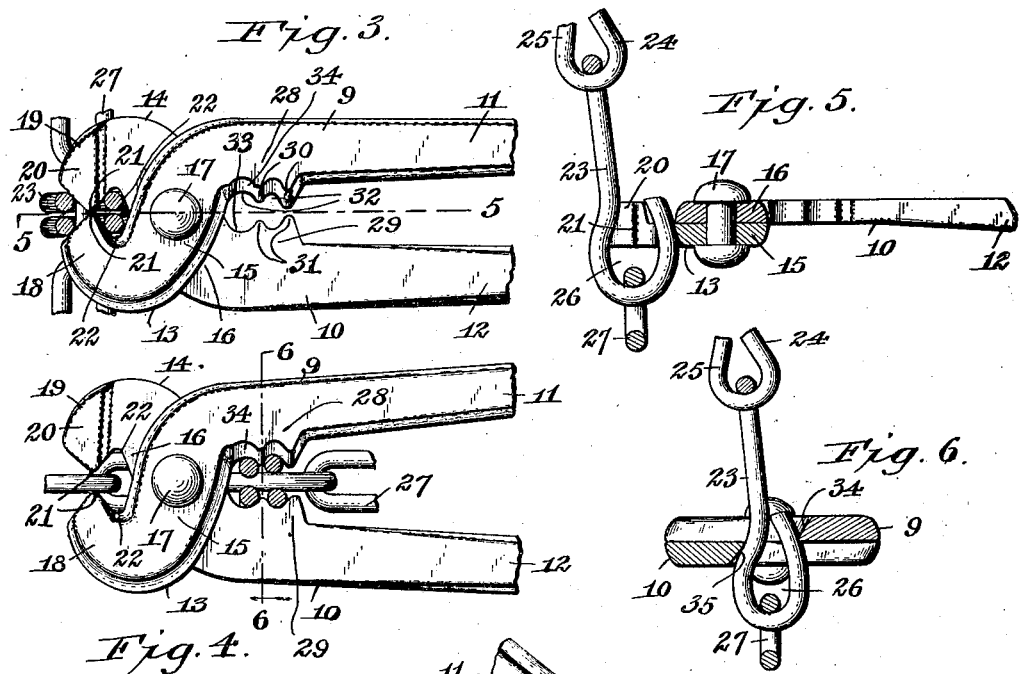
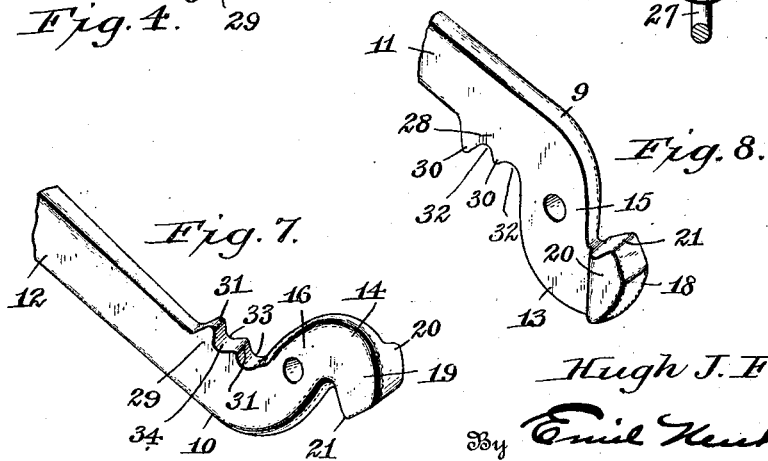
Inventor:
Hugh J. Friedl,
By Emil Neuharth,
Attorney.
Witness:
J. J. Oberst.

Patented Jan. 8, 1929.

1,698,474

UNITED STATES PATENT OFFICE.

HUGH J. FRIEDL, OF BUFFALO, NEW YORK, ASSIGNOR TO McKAIG-HATCH, INC., OF BUFFALO, NEW YORK, A CORPORATION OF NEW YORK.

CHAIN PLIERS.

Application filed May 16, 1923. Serial No. 639,307.

My invention relates to chain pliers, and more particularly to pliers adapted for opening and closing the links of chains.

The primary object of my invention is to provide pliers of improved construction wherewith the tread or cross chains of what are known as the "Weed" type non-skid tire chains, may be disconnected from the circular or side chains and new chains substituted and permanently connected with said circular or side chains.

A further object of my invention is to so construct the pliers with offset closing teeth and with such teeth so arranged that when moving the handles of the pliers toward each other, counteracting forces are applied at opposite sides of the longitudinal center of the pliers against the link to be closed so that there is no tendency of the pliers slipping lengthwise along or sidewise from the link.

A further object is to provide pliers with closing teeth having sharp edges along the inner or opposing sides of its two members, the wires of the link to be closed being adapted to be entered in the notches at opposite sides of one of the teeth, so as to more effectively act against the wire in closing the link over an adjoining link, or over a link of another chain.

A still further object is to provide pliers of this type with thickened jaw terminals and to provide said thickened terminals with oppositely beveled portions forming cutting edges co-extensive transversely, whereby a link of a chain may be cut into two parts, and whereby a link may be spread for connecting or disconnecting it from another member.

The cross or tread chains of non-skid chain devices adapted to be applied to automobile tires invariably have connecting links at opposite ends adapted to be connected to the side chains of the device, and these connecting links are provided with eyes at their extremities which are capable of being opened or closed. Substitute cross chains, purchasable in the market, have the eyes of these end connecting links open, for connecting them to a link of one of the side chains and a suitable tool capable of closing the eyes of the links to connect them to the side chains is necessary where worn cross or tread chains are to be replaced. My invention is designed to accomplish such results in an effective and convenient manner and without the exercise of undue effort on the part of the user.

With the above and other objects in view, the invention consists in the novel features of construction, and in the arrangement and combination of parts to be hereinafter described and more particularly pointed out in the subjoined claim.

In the drawings:—

Fig. 1 is a perspective view showing my improved pliers applied to one of the connecting end links of a cross chain in the act of closing the eye of said connecting link after threading the same through a link of a side chain.

Fig. 2 is a similar view showing my improved pliers in the act of opening the eye of one of the connecting links of one of the cross chains, with a view of disconnecting said cross chain from a side chain.

Fig. 3 is a side elevation of the pliers with the free end portions of the handles broken away, the spreading or opening jaws of the pliers being shown as having separated the wire forming the eye of one of the connecting end links of a cross chain.

Fig. 4 is a similar view showing the pliers in action to press the wire forming the eye of a connecting end link of a cross chain so as to close said eye.

Fig. 5 is a longitudinal section taken on line 5—5, Fig. 3.

Fig. 6 is a transverse section taken on line 6—6, Fig. 4, looking in the direction of the arrow crossing said line.

Figs. 7 and 8 are disconnected perspective views of portions of the two members forming the pliers.

The pliers comprise two members 9, 10, which have elongated straight portions serving as handles, 11, 12, and integral heads 13, 14, the heads being offset with respect to said handles; that is to say, the members at one end of the straight portions or handles thereof have angular portions 15, 16, respectively, forming parts of said heads, said angular portions crossing each other and being pivotally connected by means of a rivet 17 passed transversely through said members, or otherwise. Said angular portions 15, 16, are rebent or recurved, as at 18, 19, respectively, forming a substantially V-shaped portion at one end of each of the members of the pliers. Each recurved portion is thickened at 20, said thickened portions being formed by offsets on the inner or opposing sides of the heads 13, 14, which latter may conveniently be referred to as jaws, and more particularly as spreading jaws.

By offsetting or thickening the ends of the jaws on their inner sides, the extremities thereof are capable of being brought together and are co-extensive in a direction transversely to the length of the tool, and this enables said extremities to be formed comparatively sharp, as at 21. In fact it is of considerable advantage to have them sharp, and to have their sharp edges trending transversely so as to enable them to be employed for cutting purposes, especially for cutting a link of a chain in two, as is often desirable.

It is to be noted that the inner edges of the jaws at opposite sides of the elongated cutting edges 21 are disposed in diverging directions, and that by recurving the jaws at their ends in the manner described, each jaw has a V-shaped notch 22 at its inner side, the notches of the two jaws being alined so that the wire of a connecting link, designated for example by the numeral 23, at the end of one of the cross chains 24 of a tire non-skid chain device, may be received between the jaws, as clearly shown in Figs. 2, 3 and 4. The intermediate portions of the cross chains are invariably formed of closed twisted links 25 and these cross chains cannot be separated at any of the intermediate links except by severing the wire forming one of said links, which may be accomplished by means of the cutting edges 21 formed at the outer extremities of the two plier members.

The connecting links 23 at opposite ends of the cross chains 24 are invariably formed of a piece of wire passed through the adjacent closed link of the cross chain and each has the wire from which it is constructed double upon itself to form two stretches or portions, the outer ends of which are bent upon themselves to form an eye 26, which is closed as shown in Fig. 6.

When it is desired to disconnect a connecting end link of a cross chain from a link of a side chain, such as shown at 27, the oppositely beveled portions of the jaws 13, 14, are placed against opposite sides of the eye 26, and by moving the handles 11, 12 toward each other, the free ends of the jaws are moved toward each other and work into the eye, with the result that said oppositely beveled portions formed at opposite sides of the cutting edges 21 act against opposite portions of said eye and force the ends of the two stretches of wire forming said eye from the remaining portion of the wire, in the manner shown in Fig. 4, thus opening the eye and permitting it to be disconnected from the side chain 27.

The handles 11, 12 are widened adjacent the pivot 17, as at 28, 29, and at the inner edges of said widened portions they are provided with one or more teeth 30, 31, respectively, formed by notching said inner edges, as at 32, 33, respectively, the notches 32 of one member being in line with those of the other, and the outer faces of said widened portions are beveled inwardly, as at 34, 35, respectively, so that both the teeth and the notches are comparatively sharp and capable of taking a bite into the wire against which they are to be pressed. These widened portions may also be considered as jaws, so that the pliers have two pairs of jaws at opposite sides of a plane passing transversely through the device at the pivot 17. The jaws formed by said widened portions 28, 29 may be termed closing jaws, while those at the extreme end of the pliers may be termed spreading or opening jaws, as hereinbefore stated, the latter having their jaws co-extensive transversely while the closing jaws, or of the jaws of the closing device are offset, each moving in a different plane and having their sharp edges at the inner sides.

The two pairs of jaws close when moving the handles 11, 12, toward each other and open when the handles are moved away from each other.

Assuming a connecting link, such as 23, having its eye opened in the manner shown in Fig. 4, said link may be connected with a link of a side chain, such as shown at 27, and when so connecting said links, the eye of said connecting link is placed between the closing jaws with the doubled-up portion of one of the two stretches of wire fitting in one pair of notches oppositely disposed in said closing jaws, and the other doubled-up portion of the other of said two stretches of wire fitting in the other pair of said notches, the teeth 30, 31, which project inwardly between said notches entering between the two doubled-up stretches of wire so that when pressure is exerted against the handle to close the eye 26, the closing jaws will so grip the connecting link that it cannot turn laterally upon itself, while the sharpened edges of the notches and teeth will bite into the wire and prevent the pliers slipping lengthwise on the link along the curved doubled-up portions thereof, thus applying counteracting force laterally on the link and assuring a firm grip on the link, which will result in the closing of the eye over one side of a link of the side chain to which it is connected, without possibility of movement of the connecting link between the two members of the plier in any direction.

Where in the claim the word "transverse", or "transversely", is used, it is intended to mean crosswise or in the direction of the pivot connecting the two members of the pliers.

With the use of this invention, it is a simple matter to remove worn cross chains of non-skid chain devices for automobile tires and replace the same with new cross chains; means being provided at one or the outer side of the pivot of the pliers for opening a chain link, while at the other or inner side of said pivot, means are provided for closing such links.

Having thus described my invention what I claim is:—

Pliers for cutting or spreading portions of non-skid tire chains, comprising two members provided with angular crossed portions near corresponding ends and having reversely angled portions at such ends terminating in V-shaped portions having transversely trending sharp edges and adapted to be forced between portions of a chain link to spread the same, a pivot extending transversely through said angular crossed portions, jaws on said members at that side of said pivot opposite said reversely angled portions, said jaws being provided with gripping notches and being beveled along said notches from their outer sides to form sharp concaved portions along the inner edges of the members on which said jaws are formed, said sharp portions serving to grip portions of an open chain link or loop to close the same, the gripping notch of one of said jaws being in transverse alinement with that of the other jaw and both notches acting to provide counteracting forces against the link when closing the same.

In testimony whereof I affix my signature.

HUGH J. FRIEDL.